United States Patent [19]

Jolly, Jr.

[11] 4,197,998

[45] Apr. 15, 1980

[54] SELF-LEVELING BOOM-TYPE SPRAYING APPARATUS

[76] Inventor: John H. Jolly, Jr., 73 Montana Ave., Trenton, N.J. 08619

[21] Appl. No.: 924,784

[22] Filed: Jul. 14, 1978

[51] Int. Cl.² ............................................. B05B 3/18
[52] U.S. Cl. .................................. 239/184; 118/305; 118/323; 47/1.7
[58] Field of Search ............................... 239/164–167, 239/169, 172, 173, 175, 176, 178, 184, 187; 118/305, 307; 47/1.7

[56] References Cited

U.S. PATENT DOCUMENTS

| | | |
|---|---|---|
| 978,082 | 12/1910 | Wallace . |
| 1,118,091 | 11/1914 | Willis et al. . |
| 2,518,952 | 8/1950 | Sohmer . |
| 3,148,833 | 9/1964 | Wilson et al. ........................ 239/150 |
| 3,395,503 | 8/1968 | Greenburg et al. ................... 52/114 |
| 3,459,373 | 8/1969 | Koers ............................... 239/178 X |
| 3,532,070 | 10/1970 | Lamarque ........................ 118/305 X |
| 3,565,341 | 2/1971 | Burroughs ........................... 239/168 |
| 3,687,371 | 8/1972 | Swager .............................. 239/150 |

OTHER PUBLICATIONS

Roads and Streets Magazine, Oct. 1961, "Cost-Saving Guard Rail Scrubber," pp. 80 and 81.

Primary Examiner—Robert W. Saifer
Attorney, Agent, or Firm—John J. Kane; Frederick A. Zoda; Albert Sperry

[57] ABSTRACT

A boom-type spraying apparatus which is automatically leveling during usage in spraying materials adjacent highway fixtures such as guard rails, the apparatus provides a means for automatically controlling the level of the spraying apparatus regardless of changes in lateral or vertical movement of the vehicle carrying the reservoir of material, the spraying apparatus including preferably two boom arms which are pivotally secured to a vehicle, the boom arms preferably each include an inner end and an outer end which telescope with respect to one another and are spring biased to allow this telescoping movement, the apparatus further including a roller construction at the outer end of the boom arm which is mounted upon a spindle at the end of the boom arm such that as the vehicle travels along the road the roller will follow the guard rail therealong and as such will hold the spraying conduit and spraying head in the proper orientation for application adjacent the guard rail, the roller configuration may include a horizontal spindle section and a vertical spindle section such that the horizontal spindle section carries a rotatable roller thereon for following the top area of a guard rail whereas the vertical spindle section carries a roller for following the face of the same guard rail, the roller configuration may also preferably include a star-shaped roller lip to maintain contact with the top of the guard rail as the roller passes by the location of a securement girder which is fixedly secured to the back of the guard rail.

14 Claims, 8 Drawing Figures

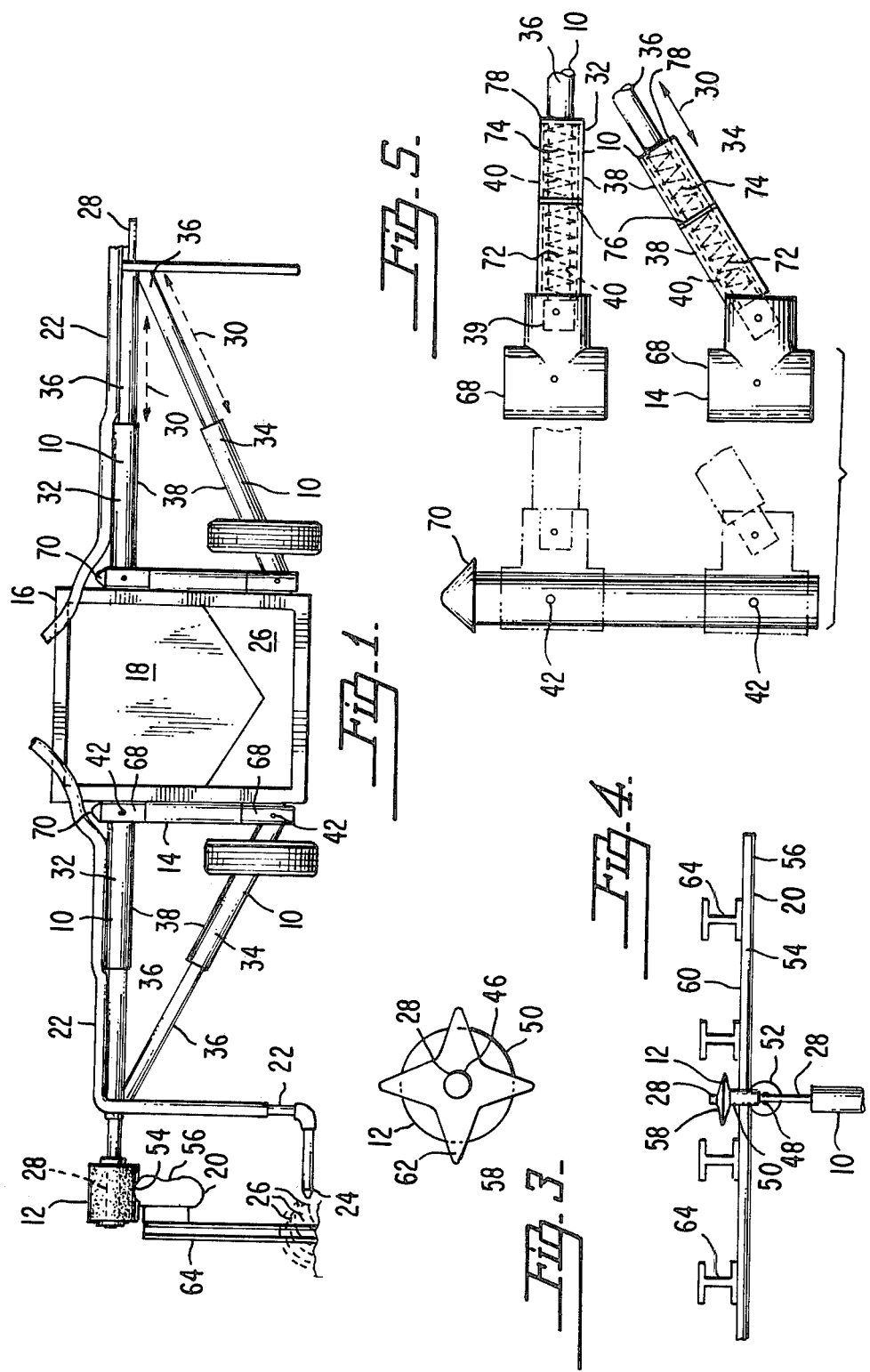

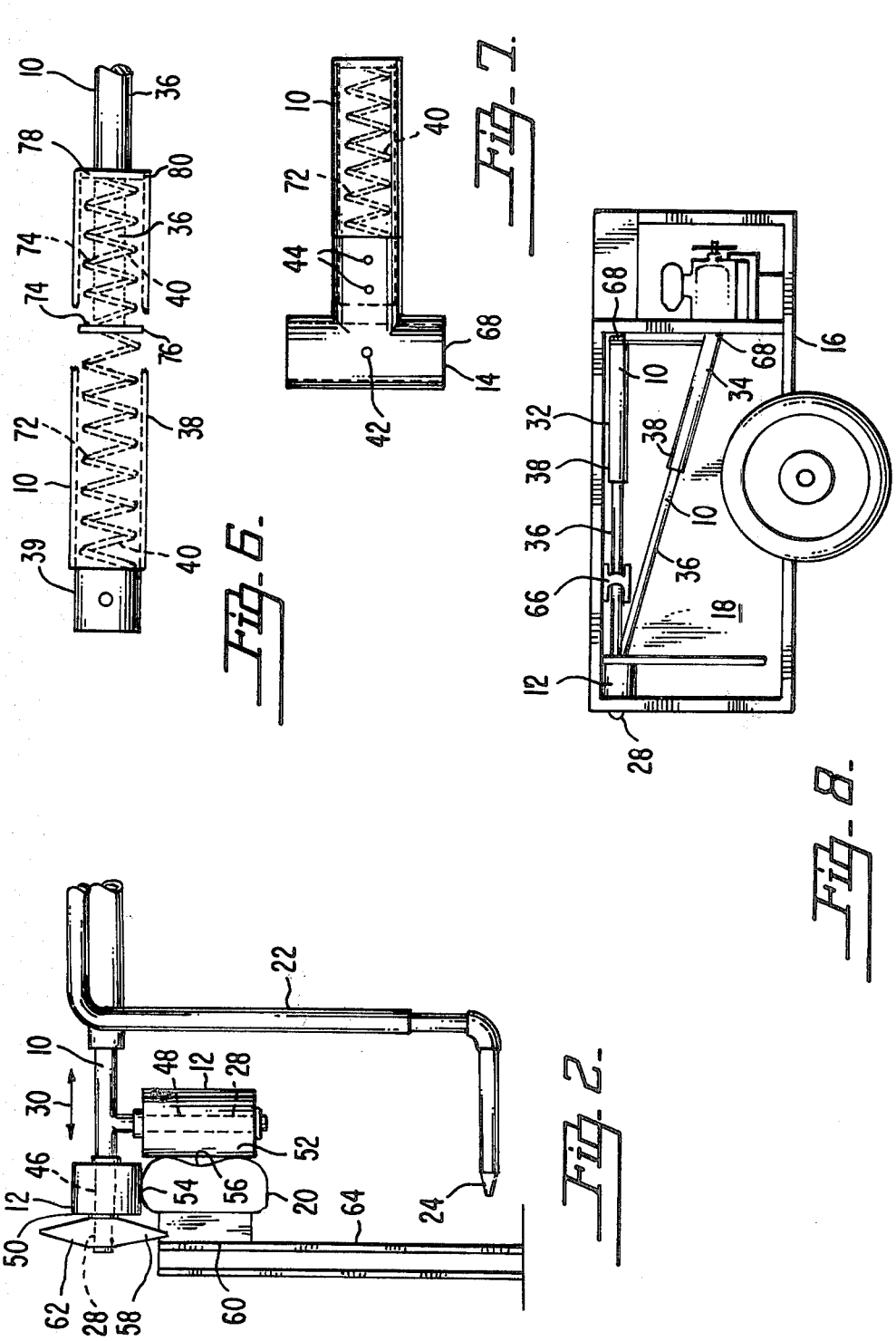

SELF-LEVELING BOOM-TYPE SPRAYING APPARATUS

BACKGROUND OF THE INVENTION

1. Field of the Invention

The present invention deals with types of apparatus which are useful in the applying of materials along highway borders and center islands thereof. It is often desirable to spray materials adjacent such longitudinally extending highway fixtures such as guard rails in order to control the growth of grass, weeds and other vegetation therealong. In order to control this growth, normally a truck will carry a trailer therebehind or may include a tank directly on the truck which functions as a reservoir for holding the supply of material to be applied to the ground adjacent the guard rail.

Normally such vehicles require operation by two men wherein one person drives the truck and the other person directs the spray of material. Normally chemical earth sterlization materials are used to kill all such grass and other weeds adjacent guard rails and the like due to the fact that highway mowing teams cannot mow these grasses and other weeds which are adjacent the longitudinally extending highway fixtures.

2. Description of the Prior Art

Presently one person drives the reservoir vehicle whereas the other person carries a hose which is manually used to apply the chemical earth sterilization liquid in an area at least one foot to both sides of the guard rails or other longitudinally extending highway fixtures. Normally such guard rails are approximately two to three feet above ground level but this dimension may vary six inches in either direction. The present invention provides a means for closely following the top edge of the guard rail and thereby automatically maintaining the proper orientation of the spray nozzle with respect to the ground area.

Prior art devices have been tried but no such device has proved as successful as the apparatus of the present design. In particular the following patents disclose configurations having similar boom structures in comparison to the present invention.

U.S. Pat. No. 978,082 Wallace;
U.S. Pat. No. 1,118,091 Willis et al;
U.S. Pat. No. 2,518,952 Sohmer;
U.S. Pat. No. 3,148,833 Wilson et al;
U.S. Pat. No. 3,395,503 Greenburg et al;
U.S. Pat. No. 3,565,341 Burroughs;
U.S. Pat. No. 3,687,371 Swager.

Of these U.S. Pat. No. 3,687,371 shows a means for spraying curbs in particular for painting wherein a roller number 26 is included for following the upper member of the curb however the design does not include the laterally extendable and retractable boom arm as claimed and disclosed in the present invention. Another configuration in the Greenburg patent, i.e., U.S. Pat. No. 3,395,503 shows a manually adjustable spring-mounted boom construction which is adjustable but is not self-leveling due to the requirement of manual adjustment.

Since none of these devices have proved satisfactory in actual operation the manual system utilizing one man driving the vehicle and another man spraying the material has been adopted by most state highway departments and as such the design of the present invention will provide a means for automating this process.

SUMMARY OF THE INVENTION

The present invention provides a self-leveling boom-type spraying apparatus for applying materials such as chemical earth sterilization liquids adjacent longitudinally extending highway fixtures such as guard rails. The spraying apparatus of the present invention is particularly usable when secured to a vehicle, which vehicle includes a reservoir for holding the supply of material to be sprayed. The vehicle may be a trailer towed behind a truck or may be a truck itself which includes a tank integral therewith.

The apparatus includes a boom arm means which is secured to the vehicle to allow vertical and horizontal pivotal movement with respect thereto. The outer end of the boom arm includes a spindle means which is adapted to receive a roller means mounted thereon. The boom arm structure is constructed such that it is extendable and retractable in an outward direction from the vehicle in order to vary the distance selectively between the spindle and the vehicle in both a vertical and horizontal direction.

The roller is rotatably mounted on the spindle such that it can engage a longitudinally extending highway fixture such as a guard rail and maintain abutment therewith regardless of minor vertical or lateral variations in positioning of the vehicle. In this manner as the driver of the vehicle may vary slightly to the left or to the right or the level of the road upon which he is driving may become slightly higher or slightly lower the roller will still be maintained in abutting following contact with the guard rail. This is the automatic self-leveling characteristic of the present invention.

Furthermore the boom arm means includes secured thereto a conduit which extends from the reservoir of the vehicle outwardly along the boom arm to provide the means for taking the fluid from the reservoir outwardly to a spraying head which is secured at the outer end of the boom arm. This spraying head is then properly oriented in order to spray the material as desired adjacent the guard rail.

The boom arm configurations preferably will include an upper and a lower member each of which is extendable and retractable. These two members should intersect at the outer end thereof adjacent the spindle. In this manner normally the upper member will be approximately horizontal and the lower member will extend slightly upward such that the upper member provides outward and inward extendability and retractability where as the lower member provides primarily upward and downward extendability and retractability to control the positioning of the spindle such that the roller may be maintained in constant engagement with the guard rail.

Further preferably each boom arm will individually include an inner member and an outer member which engage one another in a telescoping fashion. Also, each boom arm individual member will also preferably include a spring biasing means therein to control the axial telescopic movement between the inner and outer members. In this manner the boom arm means will be axially extendable and retractable in a controllable fashion.

The boom arm structure will preferably be secured to the vehicle by a mounting means which may include a breakaway pin which is adapted to selectively prevent horizontal pivotal movement of the boom arm means with respect to the vehicle. The breakaway pin means will provide the capability of preventing lateral or horizontal pivotal movement of the boom arm with respect to the vehicle and in this way will maintain the outwardly directed angle of the boom arm with respect to the vehicle. In this manner it will be normal to operate the present apparatus wherein the breakaway pin means secures the boom arm in an approximately perpendicular orientation with respect to the direction of movement of the vehicle. However, if due to faulty operation of the vehicle, the boom arm will contact a relatively immovable structure such as a telephone pole or sign or the like; the breakaway pin will break and the boom arm will be allowed to swing backwardly in an orientation approximately parallel with respect to the movement of the vehicle and as such no breakage of the boom arm components will occur.

In another alternative configuration the mounting means may include a lock pin which is selectively engageable therein to prevent vertical pivotal movement of the boom arm means with respect to the vehicle. This lock pin means will be inserted whenever only minimal vertical variations in distance between the road surface and the guard rail are to be expected.

The spindle may preferably include a horizontal section and a vertical section which are approximately perpendicular with respect to one another such that the horizontal section will extend above the guard rail and the vertical section will extend downwardly across the face of the guard rail. With this configuration the roller structure will preferably include a top roller rotatably secured to the horizontal spindle section and adapted to engage the top area of the guard rail as well as a face roller which is rotatably secured to the vertical spindle section and is adapted to abutably follow the face area of the guard rail. In this manner more accurate control of the orientation of the boom arm with respect to the guard rail will be maintained.

To further maintain engagement between the roller configuration and the guard rail the top roller may include a roller lip which extends downwardly behind the back of the longitudinally extending highway fixture such as the guard rail and in this manner will further assure engaging of the roller means with the guard rail due to the fact that the guard rail will be maintained in a horizontal position between the inside of the face roller and the inside of the roller lip of the top roller. With this configuration a problem arises with respect to the points where the securement girders hold the highway fixture in place. This difficulty is overcome by the formation of the roller lips into a star-shaped configuration such that the star will rotate through one point as the roller structure and boom arm assembly passes over the location of a securement girder. In this manner the bottom surface of the rotating top roller will be maintained in contact with the top area of the guard rail.

It is an object of the present invention to provide a boom-type spraying apparatus which is self-leveling.

It is an object of the present invention to provide a self-leveling boom-type spraying apparatus which is useful in applying chemical earth sterilization liquids adjacent longitudinally extending highway fixtures such as guard rails.

It is an object of the present invention to provide a self-leveling boom-type spraying apparatus which is useful in the spraying of materials contained within reservoirs of highway surfacing vehicles.

It is an object of the present invention to provide a self-leveling boom-type spraying apparatus which is useful for the control of the growth of grass, weeds, and other plant life adjacent longitudinally extending highway fixtures.

It is an object of the present invention to provide a self-leveling boom-type spraying apparatus wherein highway chemical earth sterilization processes can be carried out by a single individual driving a truck rather than requiring the usage of two individuals wherein one drives the truck and one directs the spray of the sterilizing material manually.

It is an object of the present invention to provide a self-leveling boom-type spraying apparatus which utilizes telescoping sleeves to maintain proper orientation between the spraying nozzle and the rollers which engage the guard rail regardless of minimal, lateral or vertical changes in positioning of the highway vehicle.

It is an object of the present invention to provide a self-leveling boom-type spraying apparatus usable to concentrate and confine control of chemicals being sprayed to the area desired to avoid overspray that would possibly kill other vegetation and causing erosion.

It is an object of the present invention to provide a self-leveling boom-type spraying apparatus which avoids hesitations caused by stopping at I-beams which causes puddling of chemicals.

It is an object of the present invention to provide a self-leveling boom-type spraying apparatus which minimizes human contact with chemicals.

It is an object of the present invention to provide a self-leveling boom-type spraying apparatus which will be economical in operation since chemicals will be sprayed exactly at the calibrated settings as prescribed by the environmental protection standards without wasteful overspray.

It is an object of the present invention to provide a self-leveling boom-type spraying apparatus which increases the speed of application many fold and is relatively maintenance free.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a rear view of a preferred embodiment of a self-leveling boom-type spraying apparatus of the present invention showing boom arms extending in both directions from a highway vehicle;

FIG. 2 shows a front view of an embodiment of the roller assembly of the present invention shown utilizing the roller lip and face roller to maintain engagement with a guard rail;

FIG. 3 shows an end view of an embodiment of the star-shaped lip of the present invention;

FIG. 4 shows a top plan view showing engagement by an embodiment of the roller assembly of the present invention with a conventional guard rail supported by I-beams;

FIG. 5 is a partially exploded view showing engagement between embodiments of the dual boom-arm configuration and the mounting means of the present invention;

FIG. 6 shows a disassembled view of an embodiment of the spring-biased telescoping engaging system between an inner and outer boom arm member;

FIG. 7 shows an embodiment of the engaging means between a boom arm and a mounting means including a lock pin for eliminating vertical pivotal movement therebetween;

FIG. 8 shows a side view of a highway trailer with an embodiment of the spraying apparatus of the present invention secured thereto for storage.

DETAILED DESCRIPTION OF THE PREFERRED EMBODIMENT

The self-leveling boom type spraying apparatus of the present invention includes a boom arm means such as boom arms 10 which are secured at the inner end to a vehicle 16 by a mounting means 14. The vehicle includes a reservoir 18 for holding material 26 therein for spraying.

The boom arms 10 extend outwardly from the vehicle 16 and include at the outer end thereof a spindle means 28 which is adapted to receive mounted thereon a roller structure such as roller 12. The boom configuration 10 includes secured thereto a conduit 22 such as a hose or the like which provides the path for the flow of material 26 from reservoir 18 within vehicle 16. The material flows through the conduit 22 outwardly and is dispersed into the surrounding environment as desired by passage through spraying head 24. Preferably the roller 12 will follow the top of a longitudinally extending highway fixture such as guard rail 20 to thereby supply the material 26 through the spraying head 24 into the ground area to destroy weeds and other plant life growing adjacent the longitudinally extending highway fixture 20.

The present invention provides a means for such highway related spraying operations wherein a spraying apparatus is securable to a vehicle such as a trailer carrying a reservoir 18 such that the materials are applied adjacent longitudinally extending highway fixtures such as guard rails for any of a variety of desired purposes. The present invention has particular application for chemical sterilization of the soil below the guard rail which provides difficulties when doing highway mowing operations.

The boom arms 10 of the present invention are movable in extendable and retractable fashion as shown by arrows 30 in order to maintain the abutting engagement between the roller 12 and the guard rail 20 despite slight lateral variations in the position of vehicle 16 and despite possible changes in elevation of the road surface in comparison to the guard rail 20. In this manner an automatic system for maintaining the spray head 24 in the proper orientation with respect to the guard rail 20 is assured. If a painting operation or other operation other than chemical sterilization is desired then the positioning of the spray head 24 can be readjusted appropriately. However, the present apparatus provides the means for maintaining the predetermined chosen orientation between spraying head 24 and a longitudinally extending highway fixture such as guard rail 20.

An embodiment of the present invention may preferably include an upper boom member 32 which is movable extendably and retractably in order to compensate for lateral changes in distance between the vehicle 16 and the guard rail 20. In a similar fashion, the lower boom member 34 provides the control of vertical variations between the height of the highway road and the height of the guard rail.

Each boom arm 10 in order to provide the extendable and retractable motion as shown by arrow 30 will preferably include an inner member 36 and an outer member 38 which are telescopically engaging with one another. This telescoping sleeve-like motion will allow for the slight variations in movement between the vehicle 16 and the guard rail 20. It is this automatic monitoring of the relationship between the vehicle and the guard rail which is one of the primary novel characteristics of the present invention. It is no longer necessary to include a second person on the rear portion of the highway vehicle to manually guide the spraying head 24. With the present invention, the spraying head 24 is automatically locked in proper orientation due to the fact that the position of the guard rail 20 is monitored by the roller configuration 12.

The inner member 36 and the outer member 38 are preferably telescopically interconnected by a spring biasing means 40 which preferably comprises a first spring means 72 and a second spring means 74. the first spring means 72 has the inner end thereof secured with respect to outer telescoping member 38. One manner of such securement may be by abutting the inner end of first spring means 72 against a reduced section 39 of member 38. It is actually not necessary to secure the first spring means 72 directly with respect to the outer telescoping member 38, it is only necessary to provide an abutment surface such that when the inner member 36 is moved inwardly and the retaining flange 76 also moves inwardly the springs 72 will be compressed and thereby will tend to urge the inner member 36 outwardly to seek the steady state position wherein no biasing is being exerted against member 36 either inwardly or outwardly.

The inner end of inner member 36 includes a retaining flange 76 to provide the outer surface against which the outer end of the first spring means 72 will abut. While this flange 76 provides the outer surface for abutment of first spring means 72 it also provides the inner abutment of second spring means 74. Second spring means 74 is basically wound around inner member 36 which extends from the flange 76 outwardly in a telescopic fashion. Member 36 extends completely out of the outer telescoping member 38. A threaded cap 78 of a generally annular shape extends over the outer end of outer member 38. The inner opening thereof defines an aperture through which the inner member 36 extends. With this configuration the second spring means is thereby compressed between the flange 76 and the cap 78 such that movement of the inner member 36 outwardly will cause compression of second spring means 74. This biasing will tend to urge the inner member 36 to seek the steady state position wherein no inward or outer bias is exerted against that member.

With this configuration the variations in positioning of the guard rail with respect to the vehicle can be compensated for by the boom-arms 10 due to the fact that the roller 12 will be maintained in contact with the guard rail. Slight variations in the distance of the vehicle from the guard rail or in the distance of the guard rail from the actual road surface will be compenstated for by the slight inward or outward bias which will be exerted by the frictional contact between the roller and the guard rail. These slight variations will be compensated for by the telescoping spring-biased interconnection between inner member 36 and outer member 38.

In normal operation it will be desirable to maintain the boom arms 10 in an approximately perpendicular orientation with respect to the direction of movement of the vehicle 16. In this manner a breakaway pin 42 will be positionable into each mounting coupling 68. The breakaway pin will eliminate the horizontal pivotal movement characteristic of the boom arms 10 with respect to the vehicle 16. This predetermined perpendicular orientation which is achievable by the breakaway pin 42 also provides another important purpose. If, due to improper operation of the vehicle 16, the boom arms 10 are caused to contact relatively immovable objects such as walls, telephone poles or trees the boom arms 10 when contacting the immovable objects will exert rotatable stress against the breakaway pin 42 and the breakaway pin 42 will be constructed such that it will actually "breakaway" to allow the boom arms 10 to swing backwardly. In this manner no damage will occur to the boom arms 10 or any other characteristic structure of the present invention and the entire apparatus will be operational again merely by the replacement of new breakaway pins 42 in their proper orientation.

Another alternative configuration may include the utilization of lock pins 44 which will eliminate the vertical pivotal movement between the vehicle and the boom arms 10. This elimination of vertical pivotal movement may be desirable in very flat areas where vertical variations in orientation between the vehicle and the guard rail is not to be expected.

The desired end purpose of the present invention is to maintain constant contact between roller 12 and guard rail 20. In this manner the spindle means 28 of the present invention may be configured to include a horizontal spindle section 46 as well as a vertical spindle section 48. The horizontal spindle section 46 may receive rotatably mounted thereon a top roller 50. Similarly a face roller 52 is adapted to be rotatably mounted upon a vertical spindle section 48. With this configuration for roller 12 the top area 54 of the guard rail will be followed by top roller 50 and, similarly, the face area 56 of the guard rail will be followed by face roller 52.

To further maintain maximum contact in a continual fashion between roller 12 and the longitudinally extending highway fixture 20 a roller lip 58 may be included on the outermost section of top roller 50. This roller lip 58 is adapted to extend downwardly behind the back area 60 of the guard rail to, in this manner, accurately position the top roller directly above the top area 54 of the guard rail. This accurate horizontal orientation is achieved due to the fact that the face roller 52 prevents movement in the inward direction whereas the roller lip 58 prevents horizontal movement in the outward direction.

The inclusion of the use of the roller lip 58 presents one additional difficulty due to the fact that securement girders such as I-beams 64 are periodically located attached to the rear surface of the guard rail 20. To overcome this problem the roller lip 58 is simply configured as a star-shaped lip 62 such that as the lip means travels toward the I-beam it will engage the inner angle area between two adjacent points and the star-shaped roller lip 62 will rotate to a distance equal to one point thereof and contact between the top roller 50 and the top area 54 will be maintained.

In other alternative configurations the vehicle 16 may include a storage bracket 66 secured thereto to hold the boom arms 10 in a condition in abutment with the vehicle 16 for storage thereof. A similar alternative configuration will include the configuration of mounting means 14 to include a pin similar to the pin in the hinge of a door which includes an enlarged head area 70 for holding the pin in proper orientation to assure the allowance of horizontal pivotal freedom of movement between the boom arms and the vehicle 16 as long as the breakaway pin 42 is not in place.

The present invention is particularly usable with respect to chemical sterilization processes due to the fact that the distance between ground level and the guard rail is maintained at a constant value with minor variations. Therefore as long as accurate control is made with respect to the knowledge of the vertical position of the guard rail the apparatus of the present invention will be able to accurately direct the spray head to spray the material as desired.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A self-leveling boom-type spraying apparatus usable in applying materials adjacent longitudinally extending highway fixtures such as guard rails, said spraying apparatus being usable secured to a vehicle which includes a reservoir for holding a supply of the material to be applied, said spraying apparatus comprising:

(a) boom arm means being vertically and horizontally pivotally secured to the vehicle at the inner end thereof and including a spindle means at the outer end thereof, said boom arm means being axially extendable and retractable to vary the distance from the vehicle to said spindle means responsive to selectively inwardly and outwardly directed bias being exerted against said spindle means;

(b) mounting means secured to the vehicle for pivotally attaching said boom arm means to the vehicle;

(c) roller means pivotally mounted to said spindle means and adapted to engage a longitudinally extending highway fixture to maintain abutment therewith as the vehicle is moved therealong by exerting selectively inwardly and outwardly directed bias against said spindle means to cause axial extending and retracting of said boom arm means;

(d) conduit means extending from the reservoir of the vehicle outwardly along said boom arm means to provide a path for the flow of material; and (e) a spraying head secured to the outer end of said conduit to control the spraying of material adjacent the longitudinally extending highway fixture.

2. The apparatus as defined in claim 1 wherein said boom arm means comprises:

(a) an extendable and retractable upper member for responding to lateral variations in distance between said roller means and the vehicle; and (b) an extendable and retractable lower member responsive to vertical variations in distance between said roller means and the vehicle.

3. The apparatus as defined in claim 1 wherein said boom arms means includes an inner member pivotally secured to said mounting means and an outer member secured to said spindle means, said inner member and said outer member engaging one another in an axially telescoping manner.

4. The assembly as defined in claim 3 wherein said boom arm means further includes spring biasing means to allow axial telescopic movement of said inner member and said outer member with respect to one another to allow said boom arm means to be axially extendable and retractable.

5. The apparatus as defined in claim 1 wherein said mounting means provides both vertical and horizontal pivotal attachment between said boom arm means and the vehicle.

6. The apparatus as defined in claim 5 wherein said mounting means further includes a breakaway pin means adapted to selectively prevent horizontal pivotal movement of said boom arm means with respect to the vehicle in response to normal horizontally directed forces.

7. The apparatus as defined in claim 1 wherein said mounting means further includes a lock pin means being selectively engageable therewith to selectively prevent vertical pivotal movement of said boom arm means with respect to the vehicle.

8. The apparatus as defined in claim 1 wherein said spindle means comprises a horizontal spindle section and a vertical spindle section, and wherein said roller means includes a top roller being rotatably secured on said horizontal spindle section and being adapted to abutably follow the top area of the longitudinally extending highway fixture, and wherein said roller means further includes a face roller being rotatably secured on said vertical spindle section and adapted to abutably follow the face area of a longitudinally extending highway fixture.

9. The apparatus as defined in claim 8 wherein said top roller includes a roller lip extending downwardly behind the back of a longitudinally extending highway fixture to further assure engagement of said roller means with the highway fixture by maintaining it horizontally between said face roller and said roller lip of said top roller.

10. The apparatus as defined in claim 9 wherein said roller lip is star-shaped to maintain abutment between said top roller and the bottom of the highway fixture when the roller means, traveling along the fixture, passes over the location of a securement girder for the highway fixture.

11. A self-leveling boom type spraying apparatus usable in applying materials adjacent longitudinally extending highway fixtures such as guard rails, said spraying apparatus being usable secured to a vehicle which includes a reservoir for holding a supply of the material to be applied, said spraying apparatus comprising:

(a) a boom arm means being vertically and horizontally pivotally secured to the vehicle at the inner end thereof and including a spindle means at the outer end thereof, said boom arm means being axially extendable and retractable to vary the distance from the vehicle to said spindle means responsive to inwardly and outwardly directed bias being exerted against said spindle means, said boom arm means comprising
(1) an extendable and retractable upper member for responding to lateral variations in distance between said roller means and the vehicle; and
(2) an extendable and retractable lower member responsive to vertical variations in distance between said roller means and the vehicle;
said upper member of said boom arm means and said lower member of said boom arm means each including an inner member pivotally secured to said mounting means and an outer member secured to said spindle means, said inner member and said outer member engaging one another in an axially telescoping manner, said boom arm means further including spring biasing means to allow axial telescopic movement of said inner member and said outer member with respect to one another to allow said boom arm means to be axially extendable and retractable;

(b) mounting means secured to the vehicle for attaching said boom arm means to the vehicle to allow vertical and horizontal pivotal movement therebetween and further including a breakaway pin means adapted to selectively prevent horizontal pivotal movement of said boom arm means with respect to the vehicle in response to normal horizontally directed forces;

(c) roller means pivotally mounted to said spindle means and adapted to engage a longitudinally extending highway fixture to maintain abutment therewith as the vehicle is moved therealong by exerting selectively inwardly and outwardly directed bias against said spindle means to cause axial extending and retracting of said boom arm means;

(d) conduit means extending from the reservoir of the vehicle outwardly along said boom arm means to provide a path for the flow of material; and (e) a spraying head secured to the outer end of said conduit to control the spraying of material adjacent the longitudinally extending highway fixture.

12. The apparatus as defined in claim 11 wherein said spindle means comprises a horizontal spindle section and a vertical spindle section, and wherein said roller means includes a top roller being rotatably secured on said horizontal spindle section and being adapted to abutably follow the top area of the longitudinally extending highway fixture, and wherein said roller means further includes a face roller being rotatably secured on said vertical spindle section and adapted to abutably follow the face area of a longitudinally extending highway fixture.

13. The apparatus as defined in claim 12 wherein said top roller includes a roller lip extending downwardly behind the back of a longitudinally extending highway fixture to further assure engagement of said roller means with the highway fixture by maintaining it horizontally between said face roller and said roller lip of said top roller.

14. The apparatus as defined in claim 13 wherein said roller lip is star-shaped to maintain abutment between said top roller and the bottom of the highway fixture when the roller means, traveling along the fixture, passes over the location of a securement girder for the highway fixture.

* * * * *